INVENTOR.
STEPHEN MORGENSTERN
BY
*Malcolm W. Fraser*
ATTORNEY

INVENTOR.
STEPHEN MORGENSTERN
BY
Malcolm W. Fraser
ATTORNEY

3,036,446
UNIVERSAL JOINT
Stephen Morgenstern, 3217 Algonquin Parkway,
Toledo, Ohio
Filed July 25, 1961, Ser. No. 126,642
4 Claims. (Cl. 64—18)

This invention relates to universal joints but more particularly to that type of joint adapted to maintain a constant velocity ratio between the driving and driven members.

According to this invention, a new and improved joint is disclosed which is exceedingly sturdy and rugged in construction and arrangement and is adapted to operate at relatively large angles under high torque conditions and which embodies novel control means for causing the intermediate member to be disposed at all times in a plane bisecting the angle between the driving and driven members in various positions of the latter, thereby to achieve and maintain constant velocity ratio between such members.

An object is to produce a simple and efficient universal joint having the above attributes of organization and arrangement and having the new and improved structural and operational features hereinafter described.

Other objects and advantages of the invention will hereinafter appear and, for purposes of illustration but not of limitation, an embodiment of the invention is shown in the accompanying drawings in which FIGURE 1 is an elevation of a universal joint embodying the invention;

Figure 1:
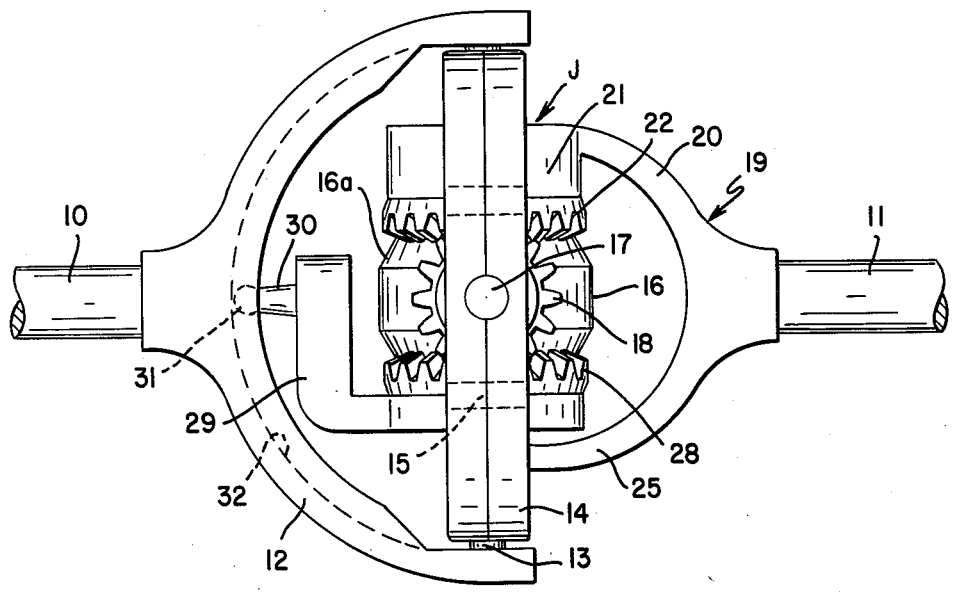
Figure 2:
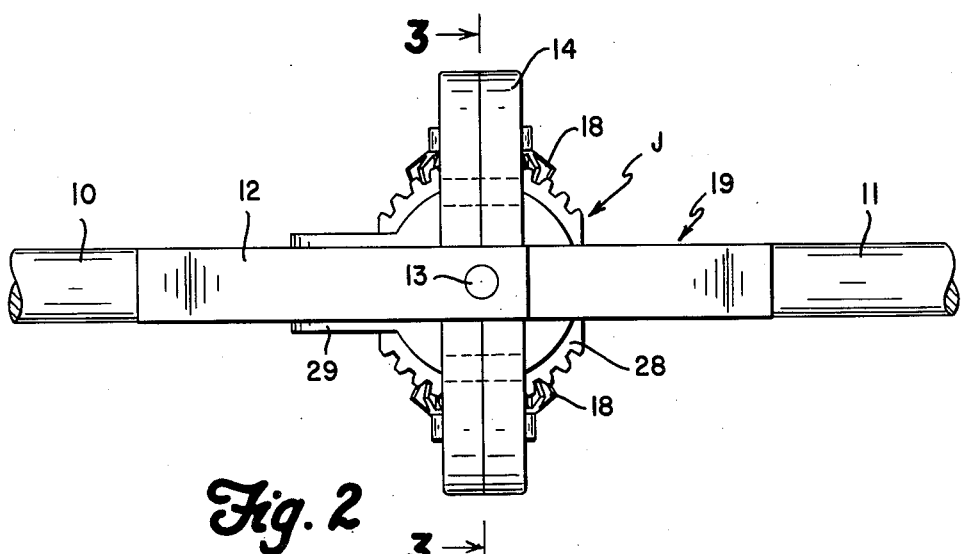
FIGURE 2 is a view of the universal joint with the parts turned at right angles to that of FIGURE 1.

The illustrated embodiment of the invention comprises main shafts 10 and 11 which are spaced from each other and interposed therebetween is a universal joint generally indicated at J. Either one of the shafts 10 and 11 may be the driving shaft and the other the driven shaft. Although the shafts are not shown supported in bearings in order more clearly to feature the possibility of angular deflection therebetween, in use either or both of these shafts may be mounted in fixed bearings, or supported in a manner to permit of the angular movement of one shaft relative to the other.

On the end of the shaft 10 is a yoke 12 on the ends of which are suitably fixed inwardly extending pins or trunnions 13 which have suitable bearing in a compensating ring 14 which in this instance is rectangular in form, the pins being disposed centrally on opposite sides thereof. The compensating ring is thus disposed on the inside of the yoke 12 and, with the shafts in alignment, the compensating ring is disposed in a plane at right angles to the axes of these shafts. The compensating ring 14 in this instance is shown in two sections which are rigidly secured together by a series of rivets 15. This construction is for the purpose of facilitating assembly of the parts.

Disposed within the compensating ring 14 is a driving block 16 having integral trunnions 17 projecting from opposite ends and arranged at right angles to the axis of the trunnions 13. End portions of the trunnion 17 have bearing in the compensating ring 14 centrally of the sides of the ring. Mounted on each of the trunnions 17 and arranged within the compensating ring 14 is a bevel gear 18 the ends of which abut respectively against the adjacent flat surface of the driving block 16 and the inner edge portion of the ring 14.

Figure 3:
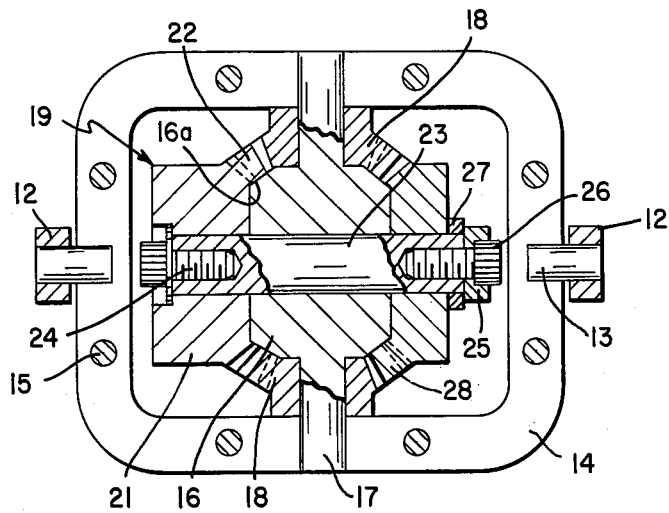
FIGURE 3 is a transverse sectional view substantially on the line 3—3 of FIGURE 2.
Figure 4:
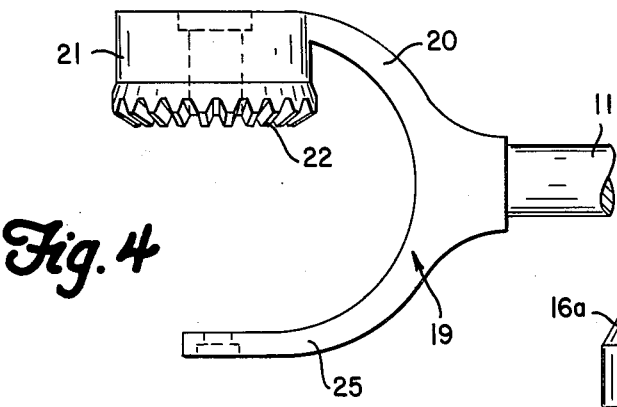
FIGURE 4 is a plan view of one of the yoke members having as an integral part gear sector means.
Figure 6:
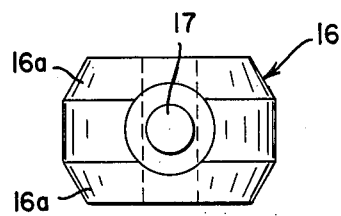
FIGURE 6 is an elevation of the driving block.
Figure 5:
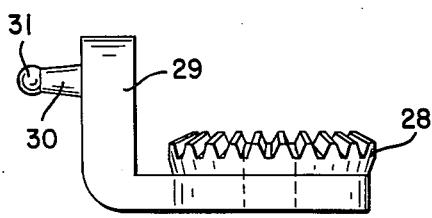
FIGURE 5 is an elevation of the other gear sector means which is connected for actuation to the other yoke member.

On the end of the shaft 11 is a yoke 19, smaller than the yoke 12 in order to be disposed within the same. On one arm 20 of the yoke 19 is an enlargement 21 integral therewith and which projects inwardly and has at its inner face, gear sectors 22 which mesh respectively with the pinions 18. As shown the enlargement 21 abuts flatwise against the adjacent side of the driving block 16. The driving block has a cylindrical central portion and tapered side edge portions 16a, the gear sectors 22 and meshing portion of the pinions 18 being similarly shaped flatwise to abut against the tapered portion 16a particularly as shown on FIGURE 3.

Arranged at right angles to the trunnion 17 and extending through the driving block 16 for turning movements therein is a pin 23 which projects beyond the adjacent outer faces of the driving block. As shown one end of the pin 23 projects into a bore formed in the enlargement 21 of the yoke 19. In the outer end of such bore is a socket to receive a washer, a screw 24 engaging the washer and extending into the pin for securing the pin 23 from shifting movement in one direction.

The other arm 25 of the yoke 19 abuts the opposite end of the pin 23 and is secured to the pin by a screw 26. Between the end portion of the arm 25 and a gear sector member 28 is a spacer sleeve 27. The gear sector member 28 is mounted for turning movement on the pin 23 and has sectors meshing respectively with the pinions 18. The gear sector member 28 is rigid with an arm which has an integral inwardly extending arm 29. On the arm 29 is an outwardly extending tapered pin 30 which has a ball-like end portion 31 disposed within and shiftable along a guide groove 32 formed in the inside of the yoke 12.

It will be observed that on that the sector members 22 and 28 there are two gear sectors arranged diametrically from each other, one sector meshing with one of the pinions 18 and the other sector meshing with the other of the pinions 18. Each sector is of sufficient size to enable and accommodate the angular movement of the respective shafts 10 and 11 through relatively large angles.

In order to achieve constant velocity ratio in a universal joint it is necessary to control the attitude of the compensating ring 14. This is achieved in this instance through the pinions 18 and gear sectors 22 and 28. Movement of either yoke 12 and 19 in an angular direction is at all times restrained to a plane bisecting the angle between the two yokes. Thus should one yoke be swung to an angle of 45°, movement of the ring 14 would be to an angle of 22½°. Manifestly the compensating ring 14 is in this instance maintained at a constant angular relationship to each of the yokes 12 and 19 regardless of any angular deviation of either of the yokes. Such movement of the ring 14 is effected positively by the gear members which are also effective in retaining the ring in the position to which it is moved. As a consequence the rotational increments of one shaft are exactly duplicated in the other shaft at whatever angle, within limits, that these shafts may be to one another, the angle being constant or varying.

Numerous changes in details of construction, arrangement, and choice of materials may be effected without departing from the spirit of the invention especially as defined in the appended claims.

What I claim is:

1. A universal joint comprising a yoke adapted to be connected to a shaft, a ring pivotally connected to said yoke, oppositely facing pinions rotatably secured to said ring and having axes which lie 90° from the axis on which the ring pivots, oppositely facing gears in mesh with said pinions respectively and having a common axis disposed at right angles to the axes of said pinions, a yoke adapted to be connected to a second shaft having one arm pivoted to the axes of said gears and the other arm connected to one of said gears, and a shiftable guiding connection between the other of said gears and said first yoke.

2. A universal joint comprising a yoke adapted to be mounted to a shaft, a ring pivotally connected to said yoke, a driving block having opposed trunnions pivoted to said ring and having axes which lie 90° from the pivotal axis of the ring, oppositely facing pinions on said trunnions respectively, a pin extending through said driving block and disposed at 90° to the axis of said trunnions, oppositely facing gears on said pin meshing respectively with said pinions and disposed on opposite sides of said block, a yoke adapted to be connected to a second shaft and having one arm fixedly secured to one of said gears, the other arm of said last yoke being pivoted to said pin, an arm secured to the other gear and extending toward the inside of said first yoke, and means establishing a shiftable connection between said arm and said first yoke enabling movement of the arm in an arcuate path.

3. A universal joint as claimed in claim 2 in which the means establishing a shiftable connection between the arm and yoke comprises an arcuate groove in the inside of the yoke into which the end portion of the arm projects and is slidable.

4. A universal joint comprising a yoke adapted to be connected to a shaft, a ring pivotally connected to said yoke, a driving block having opposed trunnions pivoted to said ring and having axes which lie 90° from the pivotal axis of the ring, oppositely facing pinions on said trunnions respectively and abutting respectively said ring and said block, a pin extending through said driving block and disposed at 90° to the axis of said trunnions, means for restraining said pin from axial shifting movement, oppositely facing gears on said pin meshing respectively with said pinions and disposed on opposite sides of said block, a yoke adapted to be connected to a second shaft and having one arm fixedly secured to one of said gears, the other arm of said last yoke being pivoted to said pin, an arm secured to the other gear and extending toward the inside of said first yoke, and means establishing a shiftable connection between said arm and said first yoke enabling movement of the arm in an arcuate path, and means for establishing a connection between said arm and said first yoke for imparting turning movement to the yoke-carried gear in response to rocking movements of said first yoke.

References Cited in the file of this patent

UNITED STATES PATENTS

| | | |
|---|---|---|
| 1,899,170 | Wainwright | Feb. 28, 1933 |
| 2,236,633 | Wingquist | Apr. 1, 1941 |
| 2,709,902 | Wildhaber | June 7, 1955 |

FOREIGN PATENTS

| | | |
|---|---|---|
| 352,079 | Germany | Apr. 24, 1922 |